Patented Oct. 13, 1925.

1,556,834

UNITED STATES PATENT OFFICE.

EUGÈNE JULES HOUDRY, OF PARIS, FRANCE, ASSIGNOR TO J. HOUDRY & FILS, OF PARIS, FRANCE, A LIMITED JOINT STOCK COMPANY.

PRODUCT FOR AUTOMATICALLY SEALING PUNCTURES IN PNEUMATIC TIRES.

No Drawing. Application filed October 12, 1922. Serial No. 594,190.

*To all whom it may concern:*

Be it known that I, EUGÈNE JULES HOUDRY, a citizen of the Republic of France, residing at Paris, France, have invented certain new and useful Improvements in Products for Automatically Sealing Punctures in Pneumatic Tires, of which the following is a specification.

The present invention relates to semi-liquid compositions for automatically closing punctures in pneumatic tires.

A composition according to the invention is obtained by a mixture of a substance having a cellulose base, a basic solution, and a weak acid.

As the substance having a cellulose base, bran can be used and as the basic solution, a solution of soda or of carbonate of soda.

The weak acid used can be hydrochloric acid highly diluted by water or better salicylic acid, which can with advantage be used slightly in excess in order to utilize its antiseptic properties.

The invention also includes a composition obtained by adding to the three above mentioned substances a certain amount of asbestos.

Such asbestos can with advantage be mixed with kieselguhr, or similar silicious powder.

There is an advantage in incorporating with the above mentioned compositions a mixture of antiseptics, sapocresol, turpentine, creosote, a colouring matter such as Soudan red and an excess of alcohol.

The invention also extends to compositions obtained by adding to any one of the above mentioned new compositions, animal or vegetable substances of the nature of hair, fur, horsehair, and the like, cut to short lengths. The compositions thus obtained ensure a perfect automatic closure of punctures in pneumatic tires. It can easily be appreciated that as soon as a puncture has occurred in the tire, the fur or the like entrained by the semi-liquid closing composition, collects on the puncture and thus effects the closure thereof.

The series of operations for obtaining one of the most complex of the compositions according to the invention is given below:—

250 litres of water are poured into a large vat and about 125 litres into two small vats. The water in the large vat is brought to the boil by a suitable furnace. A thermometer with which the large vat is provided enables the heating to be supervised.

The bran is poured into the large vat and stirrers in this vat are operated. The mixture is allowed to boil for about a quarter of an hour.

Then the carbonate of soda is added to the contents of the large vat, taking beforehand the precaution of diluting this solution in ten litres of water. The solution is poured in small quantities into the various parts of the moving mass. The boiling is allowed to continue actively for a period which varies approximately from a quarter of an hour to half an hour, according to the degree of concentration of the composition of the particular soda lye.

The heating is then stopped and the mixture is allowed to cool for another quarter of an hour to twenty minutes approximately.

Fifteen litres of cold water are then added which slightly lower the temperature and which replace the water which has evaporated.

The salicylic acid, which has been dissolved in a small quantity of alcohol, is then introduced; for this solution the minimum quantity of alcohol is used, for instance about 6 to 7 litres. It is moreover not necessary that the acid be entirely dissolved: on the contrary a small amount in excess may remain in suspension in the alcohol. The wholly or partially dissolved acid is poured in little by little, as described for the soda solution.

Conjointly with the operations above described, the asbestos is kneaded in the small vats between which it is equally divided. Kieselguhr is added to this asbestos. The kneading of asbestos and kieselguhr begins from the start of the operation, the asbestos and the kieselguhr being then added to the mixture of bran, soda solution, and salicylic acid obtained as above described.

An antiseptic mixture of sapocresol, turpentine and creosote is added, continuing the kneading.

An alcoholic solution of Soudan red, prepared in advance, is poured into the large vat.

After almost completely cooling the composition contained in the large vat, an excess of alcohol is added to the composition and the kneading is continued for one or two hours, until the product obtained is perfectly homogeneous.

The proportions in which the various substances above enumerated should be mixed can obviously be varied according to the state of the substances used; for example the proportion of asbestos to be employed can be varied in accordance with the length of the fibres thereof.

By way of example approximate quantities are given below for obtaining 600 litres of the liquid:—

| | |
|---|---|
| Bran | 30 kilogrammes |
| Carbonate of soda Solvay | 2 kg. 100 |
| Salicylic acid | 5 kg. 400 |
| Asbestos | 36 kg. |
| Kieselguhr | 4 kg. |
| Sapocresol | 2 litres 500 |
| Turpentine spirit | 0 litre 500 |
| Creosote | 150 grammes |
| Soudan red | 50 grammes |
| Alcohol | 40 litres | and water in sufficient quantity for the final product to amount to 600 litres.

Claims:

1. The herein described method of manufacturing a product for sealing punctures in pneumatic tires, which consists in heating bran and soda solution in a liquid, adding dissolved salicylic acid to said mixture and thereupon adding kieselguhr and asbestos to the mixture.

2. The herein described method of manufacturing a product for sealing punctures in pneumatic tires, which consists in boiling bran and soda solution in a liquid, permitting the mixture to cool, adding dissolved salicylic acid to said mixture and thereupon adding kieselguhr and asbestos to the mixture.

3. The herein described method of manufacturing a product for sealing pneumatic tires, which consists in boiling bran and soda solution in water, permitting the mixture to cool, thereafter adding dissolved salicylic acid, coloring matter and a disinfectant to the mixture, and finally adding kieselguhr and asbestos to the mixture.

In testimony whereof I affix my signature.

EUGÈNE JULES HOUDRY.